United States Patent [19]

Stephenson

[11] Patent Number: 4,854,951
[45] Date of Patent: Aug. 8, 1989

[54] PULSE JET FABRIC FILTER

[75] Inventor: Robert G. Stephenson, Panania, Australia

[73] Assignee: James Howden Australia Pty. Ltd., Australia

[21] Appl. No.: 191,147

[22] PCT Filed: Jul. 8, 1987

[86] PCT No.: PCT/AU87/00206

§ 371 Date: Mar. 11, 1988

§ 102(e) Date: Mar. 11, 1988

[87] PCT Pub. No.: WO88/00496

PCT Pub. Date: Jan. 28, 1988

[30] Foreign Application Priority Data

Jul. 11, 1986 [AU] Australia .................. PH06878

[51] Int. Cl.⁴ .................................. B01D 46/04
[52] U.S. Cl. ............................. 55/294; 55/302
[58] Field of Search .......... 55/273, 294, 283–288, 55/302

[56] References Cited

U.S. PATENT DOCUMENTS

| | | | |
|---|---|---|---|
| 3,487,609 | 1/1970 | Caplan ........................ | 55/294 X |
| 3,951,627 | 4/1976 | Barr et al. ..................... | 55/294 X |
| 4,157,899 | 6/1979 | Wheaton ........................ | 55/273 |
| 4,227,903 | 10/1980 | Gustavsson et al. ........... | 55/302 |
| 4,655,799 | 4/1987 | Bosworth et al. .............. | 55/273 |

*Primary Examiner*—Charles Hart

[57] ABSTRACT

A gas filter is disclosed including a clean gas section and a dusty gas section separated by a porting plate which includes concentric rings of ports providing gas communication between the two sections. The ports have connected thereto respective filter media sleeves for collecting contamination held in suspension in the gas being filtered. In order to clean the filter sleeves there is provided a back flushing gas pulse generator which is connected directly to a housing body of the filter apparatus. The gas pulse generator includes a release valve in direct communication with a hollow rotatable shaft which leads to a gas pulse distributor having arms which sweep across the clean gas section side of the porting plate. The arms of the gas pulse distributor includes apertures aligned with the respective ports of the porting plate so as to inject into the filter media sleeves a pulse of clean gas in a reversed direction so as to shake out any contaminants that have been collected in the sleeves.

6 Claims, 5 Drawing Sheets

PULSE JET FABRIC FILTER

The present invention relates to a gas filter apparatus of the gas pulse type and more particularly to such apparatus which includes improved means for generating pulses of backflushing gas.

BACKGROUND ART

Gas filter apparatus is known in which a gas stream to be cleaned is directed through an elongate filter bag from its outside to its inside and the bag is periodically cleaned by injecting into it, against the gas stream, a gas pulse which serves to very briefly reverse the direction of gas flow through the filter bag and to thereby remove from the bag particulate matter that had been retained on the filter medium. Australian Patent Specification No. 520,545 discloses a gas filter apparatus of the gas pulse type having a housing body including a dusty gas section with an inlet thereto and a clean gas section with an outlet therefrom; a porting plate mounted in the housing body separating the dusty gas section from the clean gas section and having a plurality of concentric rings of ports in the porting plate which are circularly spaced thereon, each port in a ring having a filter medium sleeve depending therefrom; a means mounted on the body for generating pulses of backflushing gas from a single source and having an outlet therefrom, and a rotary backflushing gas pulse distributing means extending radially across and spaced above the concentric rings of ports in the porting plate within the clean gas section and, having an inlet in fluid communication with the outlet of the backflushing gas pulse generator means and a plurality of radially spaced orifices therefrom, each of the orifices being spaced to rotationally traverse over and successively fluid communicate with each of the ports in a like radially spaced concentric ring. In this apparatus the backflushing gas pulse generator means includes a gas reservoir which is structurally quite separate from the housing body of the apparatus and is connected to the inlet of the rotary backflushing gas pulse distributing means by an elongate duct. A valve is provided at the junction of the duct and the distributing means inlet to periodically allow a pulse of gas to flow from the reservoir, through the duct and into distributing means. The present inventors have developed an improved form of backflushing gas pulse generator means which is a distinct improvement over the said prior art and contributes to the improved efficiency of the apparatus according to this invention.

DISCLOSURE OF THE INVENTION

In a broad form the present invention may be said to provide a gas filter apparatus having a housing body including a dusty gas section with a main inlet thereto and a clean gas section with a main outlet therefrom; a porting plate mounted in the housing body separating the dusty gas section from the clean gas section and having a plurality of radially spaced, concentric rings of ports in the porting plate, each port in a ring having a filter media sleeve depending therefrom; a generating means mounted on the body for generating pulses of backflushing gas from a single source and having a generator outlet for discharging gas therefrom; and a rotary backflushing gas pulse distributing means within the clean gas section, extending radially across and spaced from the concentric rings of ports in the porting plate, having a distributor inlet in fluid communication with the generator outlet and a plurality of radially spaced orifices, one respective orifice for each respective ring of ports, each respective orifice subscribing a circular path over the ports of the respective ring of ports and being aligned with the ports of the respective ring so as to provide successive gas communication therewith; the apparatus being characterised in that the generating means includes a gas accumulation chamber directly mounted on the housing body and having a chamber inlet in communication with pumping means for charging the chamber to a predetermined unloading pressure, and a gas release valve mounted directly on the chamber in direct communication with the generator outlet.

The arrangement according to the present invention, wherein the gas accumulation chamber is directly mounted on the housing body and wherein the gas release valve is mounted directly on the gas pulse generating means, has two substantial advantages over the foregoing prior art. firstly there is a reduction in the pressure loss in communicating gas from the accumulation chamber to the gas distributing means. This means that there is a reduction in the absorbed power of the pump supplying the gas to the accumulation chamber. Secondly there is a reduction in the capital construction cost of the apparatus by eliminating the connecting pipe between the accumulation chamber and the valve and preferably by utilizing a common wall between the accumulation chamber and the housing body.

Hereinafter given by way of example only is a preferred embodiment of the present invention described with reference to the accompanying drawings in which:-

BEST MODE OF CARRYING OUT THE INVENTION

Figure 1:
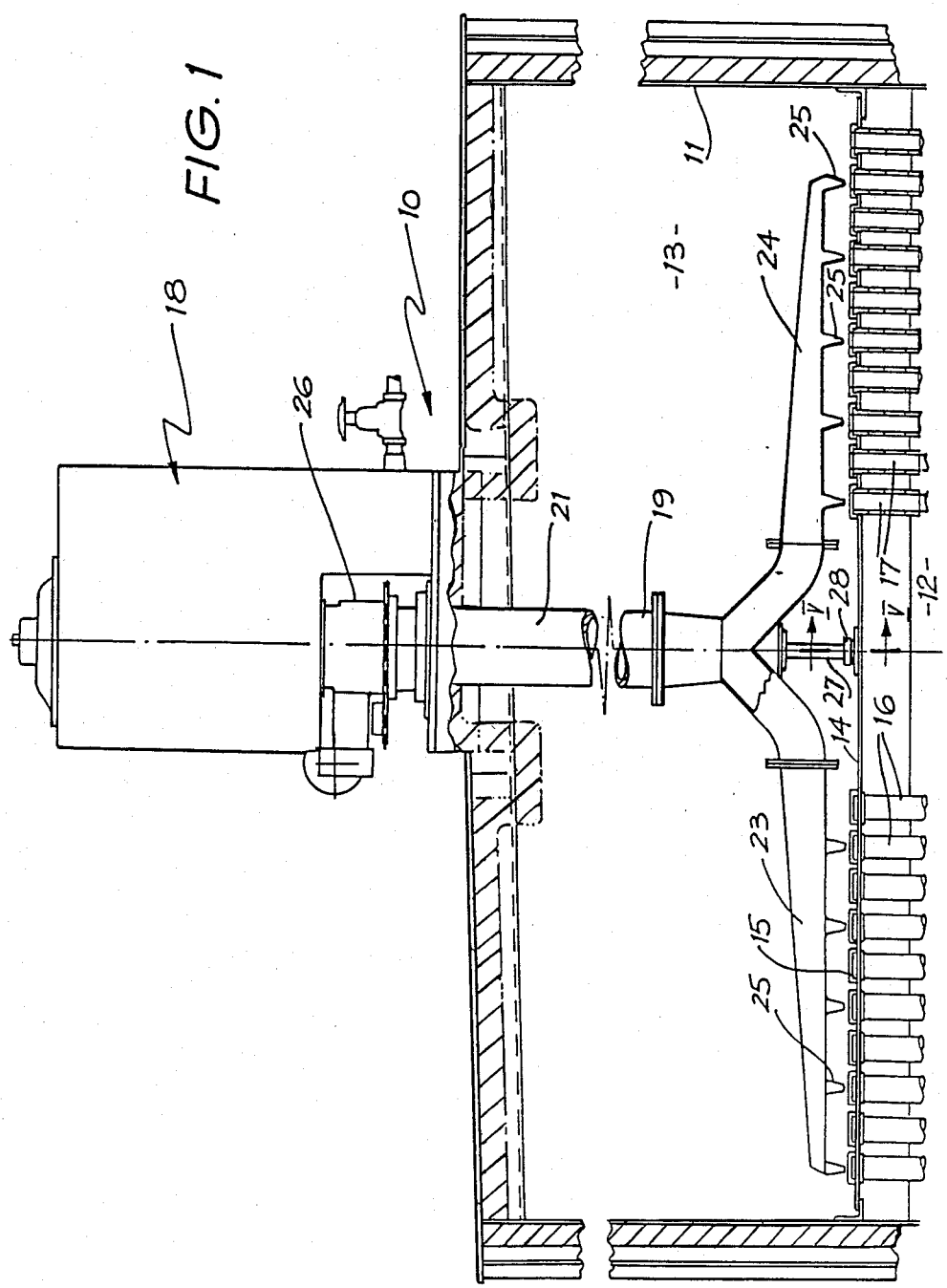
FIG. 1 is a vertical sectional view through an upper part of apparatus according to the present invention.

The apparatus 10, as is best seen in FIG. 1 comprises:
(a) a housing 11 which includes a dusty gas section 12 having an inlet (not shown) and a clean gas section 13 with an outlet (not shown);
(b) a porting plate 14 mounted in the housing 11 and separating the dusty gas section 12 from the clean gas section 13 and having a plurality of concentric rings of ports 15 circularly spaced on the porting plate 14; each port 15 has a closed ended filter medium sleeve 16 depending therefrom. Each of the sleeves 16 is supported against collapse by a wire cage 17;
(c) means 18 mounted on the housing 11 for generating pulses of backflushing gas; and
(d) a rotary backflushing gas pulse distributing means 19 extending radially across and spaced above the concentric rings of ports 15 in the porting plate 14 within the clean gas section 13 of the housing 11.

The housing 11, porting plate 14, and filter medium sleeves 15 may be of entirely conventional construction and will not be further described herein.

The rotary backflushing gas pulse distributing means 19 includes a vertically extending inlet tube 21 which is in fluid communication with an outlet tube 22 of the gas pulse generating means 18. At its lower end tube 21 is connected to a pair of radially extending gas manifolds 23 and 24. Each manifold 23 and 24 extends across and above the porting plate 14 and carries a plurality of downwardly directed nozzles 25. The nozzles 25 of manifold 23 are positioned so that they respectively rotate over one of the even numbered rings of ports 15 while the nozzles 25 of the manifold 24 are positioned so that they respectively rotate over the odd numbered rings of ports 15. Clearly the distributing means can be produced in alternative manners as a matter of design preference. For example, the nozzle of each manifold 23 and 24 can be arranged as a plurality of equally radially spaced pairs, each nozzle 25 of a respective pair aligning upon rotation with its respective ring of ports 15.

Figure 5:
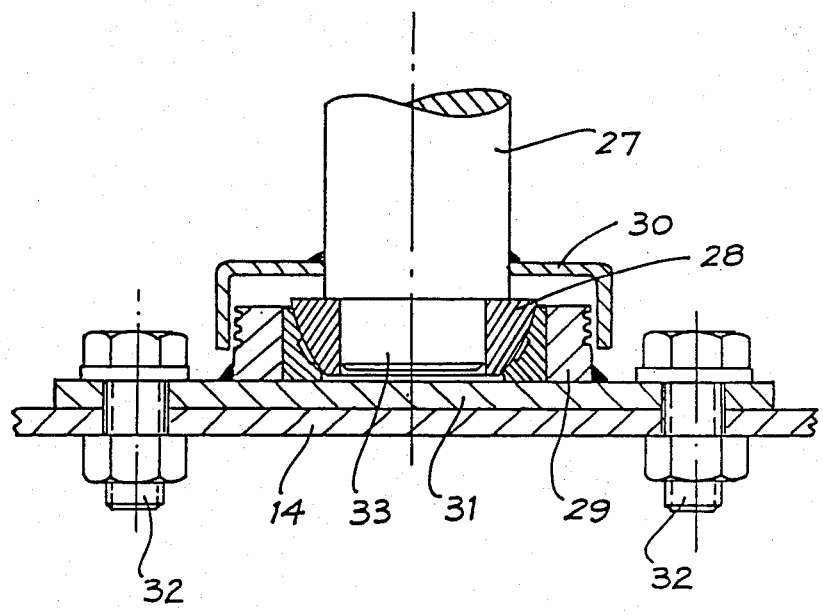
FIG. 5 is a vertical sectional view along V—V of FIG. 1.

The tube 21 and manifolds 23 and 24 are supported by an upper bearing 26 connected to the housing 11 and by a support 27 and a lower bearing 28. As is best seen in FIG. 5 the lower bearing 28 is mounted on the porting plate 14 and is an angular contact spherical plain bearing. The bearing 28 is located within a bearing housing 29 on a mounting plate 31 which is bolted by bolts 32 to the porting plate 14. The bearing 28 can be of any alternative suitable construction. The support 27 is journalled at its lower end 33 to fit within bearing 28 and has welded to it a downwardly opening bell shaped dust cover 30 which surrounds the bearing housing 29.

Figure 2:
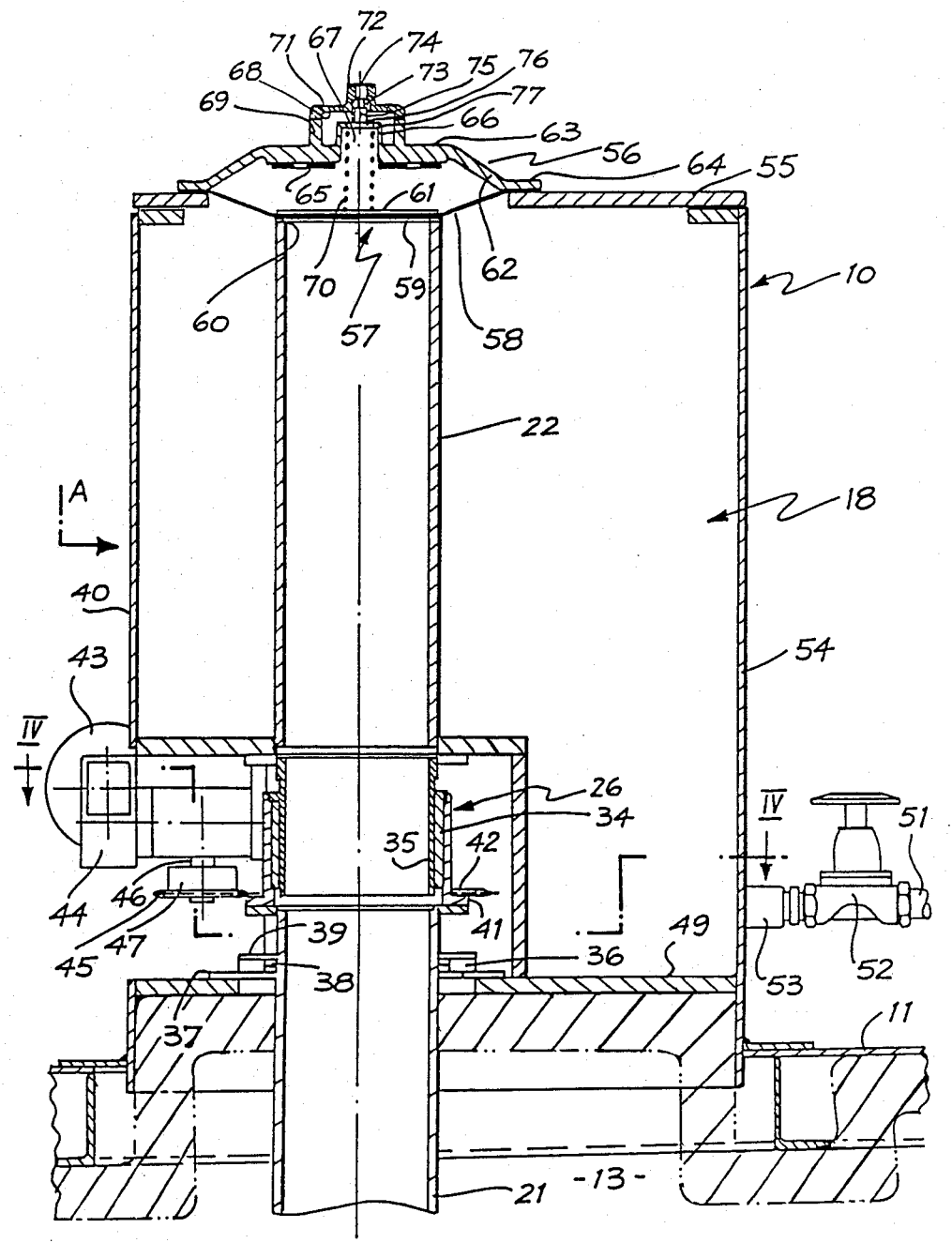
FIG. 2 is a vertical sectional view through the gas pulse generating means of the apparatus of FIG. 1 on an enlarged scale.
Figure 3:
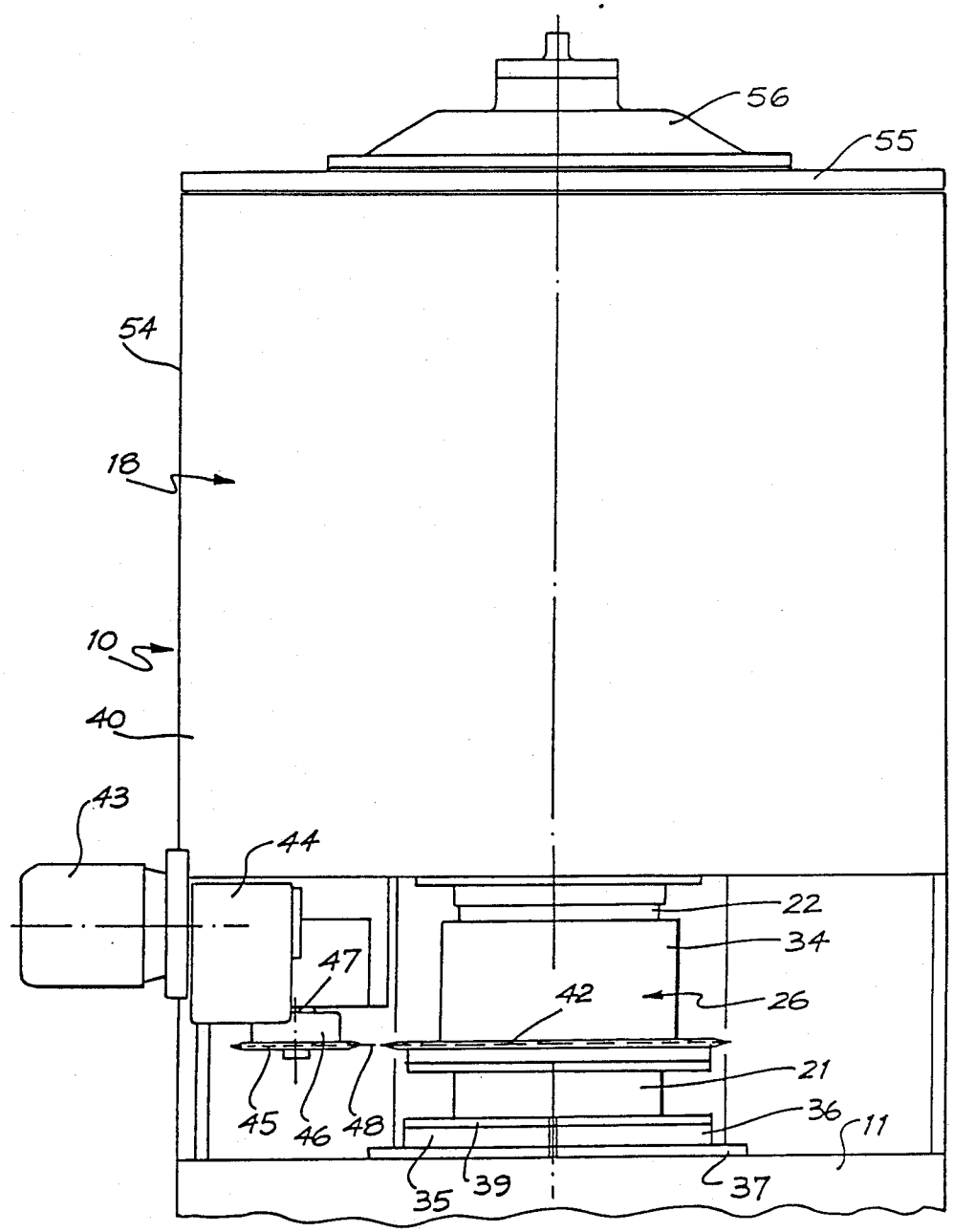
FIG. 3 is a side elevational view of the gas pulse generating means of the apparatus seen in the direction A of FIG. 2 on an enlarged scale.
Figure 4:
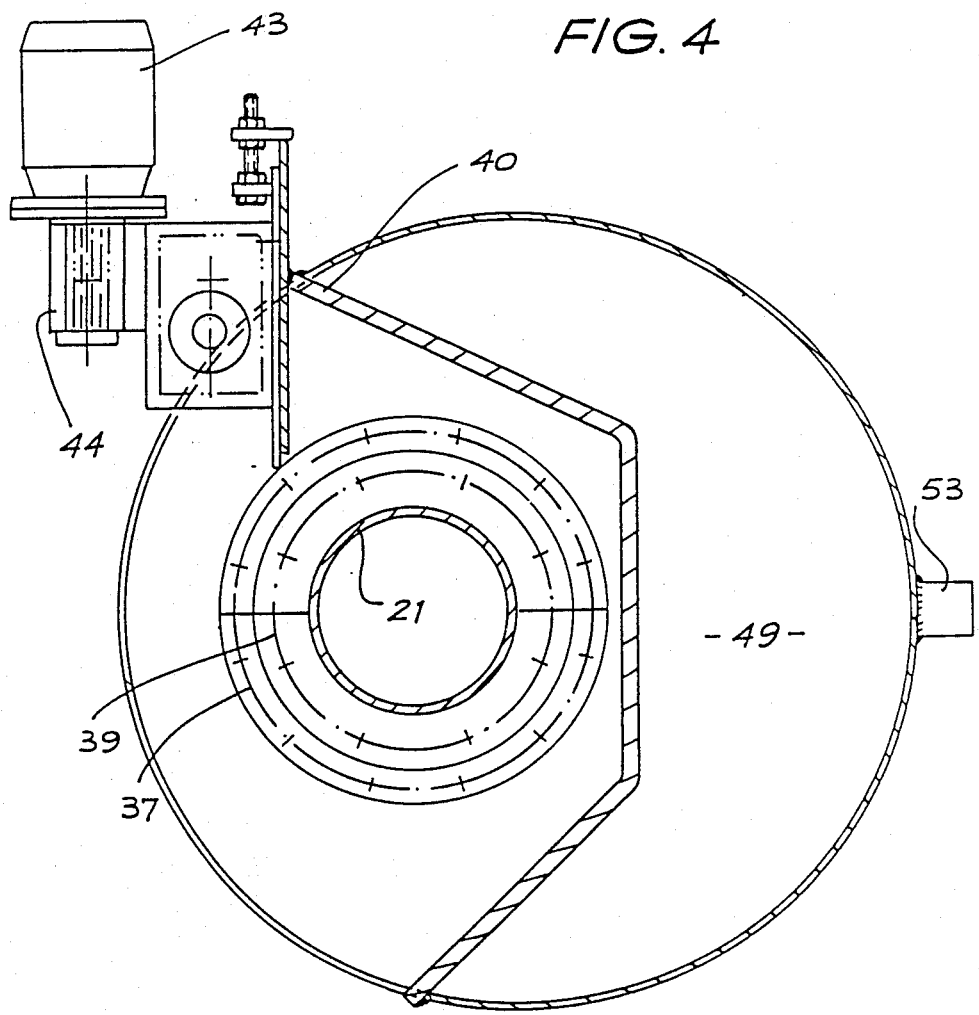
FIG. 4 is a transverse sectional view along IV—IV of FIG. 2.

The bearing 26 at the upper end of the tube 21, as is best seen in FIG. 2, comprises a bearing housing 34 connected at its lower end to the upper end of the tube 21. The bearing housing 34 surrounds a bronze bush 35 which in turn surrounds the lower end of tube 22. An oil seal is positioned at the upper end of the bearing housing 34 to provide a seal between the housing 34 and tube 22.

A seal 36 is provided around the tube 21 where it penetrates the housing 11. The seal 36 comprises a split seal housing 37, a tube seal packing 38 and a split seal cover 39.

The lower end of the bearing housing 34 carries a radially outwardly extending flange 41 to which is bolted a chain plate wheel 42. The gas pulse distributing means 19 is caused to rotate by a chain drive to the chain plate wheel 42. The chain drive comprises motor 43 and double reduction gearbox 44 bolted to the housing 40 of the gas pulse generating means 18 which drive a sprocket 45 connected to gearbox output shaft 46 through a free-wheeling clutch 47. The sprocket 45 and chain plate wheel 42 are connected by chain 48.

The gas pulse generating means 18 includes a housing 40 which is mounted directly on top of housing 11 has a common wall 49 therewith. The housing constitutes a gas accumulation tank or reservoir which receives gas from a pump (not shown) through pipe 51, valve 52 and inlet nipple 53. The housing 40 includes a substantially cylindrical side wall 54 and a top plate 55. A gas release valve assembly 56 is bolted onto the top plate 55 which projects through an aperture therein in concentric alignment with gas pulse outlet tube 22.

The valve 56 includes a normally closed two way unloading valve 57 which cooperates with a valve seat 60 formed on the upper end of outlet tube 22. The valve 57 comprises a main valve diaphragm 58 made of a neoprene impregnated woven nylon fabric sheet which has two small diametrically spaced orifices in it (not shown). A circular seal plate 59 and a backing plate 61 are connected to the diaphragm 58 concentrically therewith. The seal plate 59 serves to make sealing engagement with the valve seat 60 on tube 22.

A coned cover 62 having a flat top section 63 incorporates an O.D. flange 64 which is bolted to the top plate 55. A bumper 65 is bonded to the underside of the flat section 63 of cover 62 in concentric relation therewith. A main diaphragm spring upper retainer cup 66 mounts a main valve exhaust port 67 in concentric and inverted relationship atop the cover section 63. A main valve compression spring 70 seats in the upper retainer cup 66 and bears against the backing plate 61 to urge the seal plate 59 against the valve seat 60.

A reverse logic, normally closed, two-way secondary valve 68 is mounted on the top side of cover 62. The valve 68 comprises a cylindrical body 69 which encompasses the spring retainer cup 66 and main valve exhaust port 67 and has a plurality of exhaust ports (not shown) in the wall thereof. A secondary valve cover 71 mounts on top of the body 69 and includes an exhaust boss 72 having a shouldered recess 73 therein which is concentric with the cylindrical body 69 and extends up from the top side of cover 71 to a threaded boss 74 and forms an upper guide for a secondary valve spring 75. A secondary valve seat 77 surrounds the exhaust port 67 of the main valve. A secondary valve diaphragm 76 is retained between valve body 69 and cover 71 and is urged against valve seat 77 by secondary valve spring 75.

A solenoid operated or pneumatically-operated trigger valve (not shown) is mounted in the threaded bore 74 in cover 71. The trigger valve dumps the secondary valve to generate a pulse of gas by unloading the main valve thereby allowing the gas pulse to flow through outlet tube 22 into the gas pulse distributing means 19.

It will be recognised by persons skilled in the art that numerous variations and modifications may be made to the invention as described above without departing from the spirit or scope of the invention as broadly described.

I claim:

1. A gas filter apparatus having a housing body including a dusty gas section with a main inlet thereto and a clean gas section with a main outlet therefrom; a porting plate mounted in the housing body separating the dusty gas section from the clean gas section and having a plurality of radially spaced, concentric rings of ports in the porting plate, each port in a ring having a filter media sleeve depending therefrom; a generating means for generating pulses of backflushing gas having an inlet supplied with pressured gas from a single source and having a generator outlet for discharging gas therefrom; and a rotary backflushing gas pulse distributing means within the clean gas section, extending radially across and spaced from the concentric rings of ports in the porting plate, having a distributor inlet in fluid communication with the generator outlet and a plurality of radially spaced orifices, one respective orifice for each respective ring of ports, each respective orifice subscribing a circular path over the ports of the respective ring of ports and being aligned with the ports of the respective ring so as to provide successive gas communication therewith; the apparatus being characterised in that :

the generating means includes a gas accumulation chamber directly mounted on the housing body, and a gas release valve directly on and within the chamber and fixed to, and axially aligned with, the generator outlet ; and the distributor inlet is directly fluidly coupled to, and axially aligned with, the generator outlet.

2. A gas filter apparatus as defined in claim 1, wherein each filter media sleeve includes an internally placed substantially rigid cage so as to maintain the sleeve in a predetermined shape.

3. A gas filter apparatus as defined in claim 1, wherein a portion of the housing body onto which the gas accumulation chamber is directly mounted defines one end wall of the gas accumulation chamber.

4. A gas filter apparatus as defined in claim 1, wherein the distributor inlet is formed in a hollow shaft being contiguous with the distributing means and defining a rotary support therefor.

5. A gas filter apparatus as defined in claim 4, wherein the generator outlet is cylindrical and concentrically partially overlaps the hollow shaft, the generator outlet having the release valve directly attached thereto at an end thereof opposite to the end overlapping the hollow shaft.

6. A gas filter apparatus as defined in claim 1, wherein a secondary valve is operable so as to open the release valve, the release valve being normally closed.

* * * * *